United States Patent

Suonvieri

Patent Number: 5,668,804
Date of Patent: Sep. 16, 1997

[54] BASE STATION WITH TIME-ALIGNED MOBILE TRANSMITTING MOMENTS ACCORDING TO DISTANCE TO BASE STATION

[75] Inventor: Jukka Suonvieri, Oulu, Finland

[73] Assignee: Nokia Telecommunications Oy, Espoo, Finland

[21] Appl. No.: 581,599

[22] PCT Filed: Jun. 29, 1994

[86] PCT No.: PCT/FI94/00298

§ 371 Date: Jan. 5, 1996

§ 102(e) Date: Jan. 5, 1996

[87] PCT Pub. No.: WO95/02306

PCT Pub. Date: Jan. 19, 1995

[30] Foreign Application Priority Data

Jul. 5, 1993 [FI] Finland ................ 933091

[51] Int. Cl.⁶ .................................................. H04J 3/06
[52] U.S. Cl. ............................ 370/331; 370/350; 370/519
[58] Field of Search ......................... 370/95.1, 95.3, 370/110.1, 100.1, 108, 103, 104.1, 105.1, 105.2, 310, 330, 314, 328, 329, 331, 332, 336, 337, 324, 350, 436, 442, 458, 478, 498, 503, 516, 517, 518, 519; 455/33.1, 51.1, 33.2, 73, 18, 34.1, 33.4, 34.2; 379/60, 59; 375/356, 371

[56] References Cited

U.S. PATENT DOCUMENTS 4,800,560  1/1989  Aoki et al. .
4,993,026  2/1991  Yamashita .
5,229,996  7/1993  Bäckström et al. ............... 370/100.1
5,483,537  1/1996  Dupuy ................................ 370/95.3
5,544,171  8/1996  Gödecker .......................... 370/95.3

FOREIGN PATENT DOCUMENTS 0 171 525   2/1986   European Pat. Off. .
0 186 229   7/1986   European Pat. Off. .
0 295 227   12/1988  European Pat. Off. .
0317 159    5/1989   European Pat. Off. .
0 371 500   6/1990   European Pat. Off. .
0 564 429   10/1993  European Pat. Off. .

Primary Examiner—Wellington Chin
Assistant Examiner—Huy D. Vu
Attorney, Agent, or Firm—Cushman Darby & Cushman Intellectual Property Group of Pillsbury Madison & Sutro, LLP

[57] ABSTRACT

For increasing the radius of the effective service area of a base station in a digital time division multiple access (TDMA) radio network, a first transceiver is provided for communicating with mobile radio stations only within a radially outer annular region, and a second transceiver is provided for communicating with the mobile radio stations within a central region a radially outer marginal portion of which overlaps with a radially inner marginal portion of the outer annular region. Timing offsets between transmissions from the base station transceivers and transmissions from the mobile stations being such that respective transmissions are received within proper time slots despite that the outer radius of radially outer annular region would necessitate a larger than workable time delay were the first transceiver used by itself for serving the entire radial extent of the respective composite effective coverage areas of the first and second transceivers.

11 Claims, 3 Drawing Sheets

5,668,804

BASE STATION WITH TIME-ALIGNED MOBILE TRANSMITTING MOMENTS ACCORDING TO DISTANCE TO BASE STATION

This application claims benefit of international application PCT/FI94/002989 filed Jun. 29, 1994.

BACKGROUND OF THE INVENTION

The invention relates to a base station for a digital time division multiple access radio network, the base station comprising a radio transceiver, means for measuring a time difference between the transmissions of the transceiver and a mobile radio station due to a distance between the base station and the mobile radio station, and means for controlling the mobile radio station to adjust its transmission relative to the transmission of the transceiver by a predetermined timing advance compensating for said time difference, said timing advance having a maximum value determining a maximum radius $r_{max}$ for an effective service area of the base station transceiver.

In digital Time Division Multiple Access (TDMA) radio systems, a plurality of mobile radio stations may utilize the same radio channel on a time division basis for communication with the base station. Communication on the radio channel takes place in a number of successive time slots, e.g. 8 time slots, allocated to the users as required. A mobile radio station is synchronized with a signal from the base station, and it transmits in accordance with this sync so that the signal from the mobile station is received at the base station in a time slot allocated for this particular mobile station. Mobile stations, however, may be located at different distances from the base station, whereby the propagation delay caused by this distance has to be taken into account in the synchronization of the timing of transmission of each mobile station with the base station so that the signal will be received at the base station in the right time slot. For this purpose, the base station measures the time difference between its own transmission and the transmission received from the mobile station, on the basis of which it defines a suitable timing advance for the mobile station. The mobile station uses this timing advance to advance the timing of its transmission relative to a basic time instant defined by the sync received from the base station. Various intrasystem features limit the timing advance to a certain maximum. This maximum of the timing advance, in turn, dictates the maximum cell size that the base station of the system is able to serve. In the Pan-European mobile radio system GSM (Global System for Mobile Communication), for instance, the timing advance may vary in the range between 0 and 233 µs, which means a cell size with a maximum radius of 35 km. However, such a cell size of 35 km may be too small e.g. in sparsely populated areas with a low traffic load. Due to the above-mentioned limitation, however, increasing the cell size has not been possible even though the capacity of the base station and the topology of the terrain would otherwise have allowed larger cells.

SUMMARY OF THE INVENTION

The object of the present invention is to dispense with the above problem.

This is achieved by a base station of the type described in the foregoing BACKGROUND section, which according to the invention is characterized by means for providing a timing offset between the reception and the transmission of the transceiver in a manner that the maximum radius of the service area of the transceiver is $r_1 + r_{MAX}$, and the service area has a central area which has a radius $r_1$ and within which the transceiver is not capable of providing services to mobile radio stations, where $r_1$ is directly proportional to the timing offset; a second radio transceiver where the timing between reception and transmission is normal and the outer radius of the service area of which is at a distance $r_{MAX}$ from the base station; the offset between transmission and reception being selected so that the service areas of the first-mentioned transceiver and the second transceiver overlap.

In the invention, an extended coverage area is provided around the base station by offsetting the timing of the transceiver of the base station as compared with the timing of the transmitter. The transceiver operating in this way forms an extended, typically ring-shaped service area around the base station. Within the service area, a central shadow area remains, the maximum radius of which is directly proportional to the above-mentioned offset. The maximum extended outer radius of the service area is the sum of the maximum radius defined by the maximum timing advance and the maximum radius of the central shadow area. Accordingly, in the GSM system, for instance, if the offset is selected such that the inner radius of the ring-shaped service area is 20 km, its outer radius will be 60 km. The base station according to the invention also has a normal transceiver with a normal service area of 0 to 35 km, these service areas together form a cell having a radius of 60 km. These two service areas overlap to some extent in order that the intra-base station handover between the two service areas could be performed unnoticed. In the preferred embodiment of the invention, the timing advance assigned to the mobile station is used as a handover criterion.

DESCRIPTION OF THE INVENTION

In the following the invention will be described more fully by means of illustrating embodiments with reference to the attached drawings, in which:

FIG. 1 is a block diagram illustrating a base station according to the invention, FIG. 2 illustrates the timing of the transmitters and receivers of the base station shown in FIG. 1, FIG. 3 illustrates an extended cell according to the invention, and FIG. 4 illustrates another extended cell according to the invention.

DETAILED DESCRIPTION

The present invention is intended to be applied in any radio network utilizing digital time division multiple access (TDMA) and employing a timing advance to shift the time of transmission of a mobile radio station relative to the time instant set by a sync signal transmitted from the base station in such a way that the timing advance compensates for the transmission delay caused by the distance between the base station and the mobile station, and the transmission of the mobile station is received at the base station in the correct TDMA time slot. The invention is especially suitable for use in the GSM and DCS1800 mobile radio systems. The GSM specifications and *The GSM System for Mobile Communications* (by M. Mouly and M.- B. Pautet, Palaiseau, France, 1992, ISBN:2-9507190-0-7) are referred to for a more detailed description of the GSM system.

Figure 1:
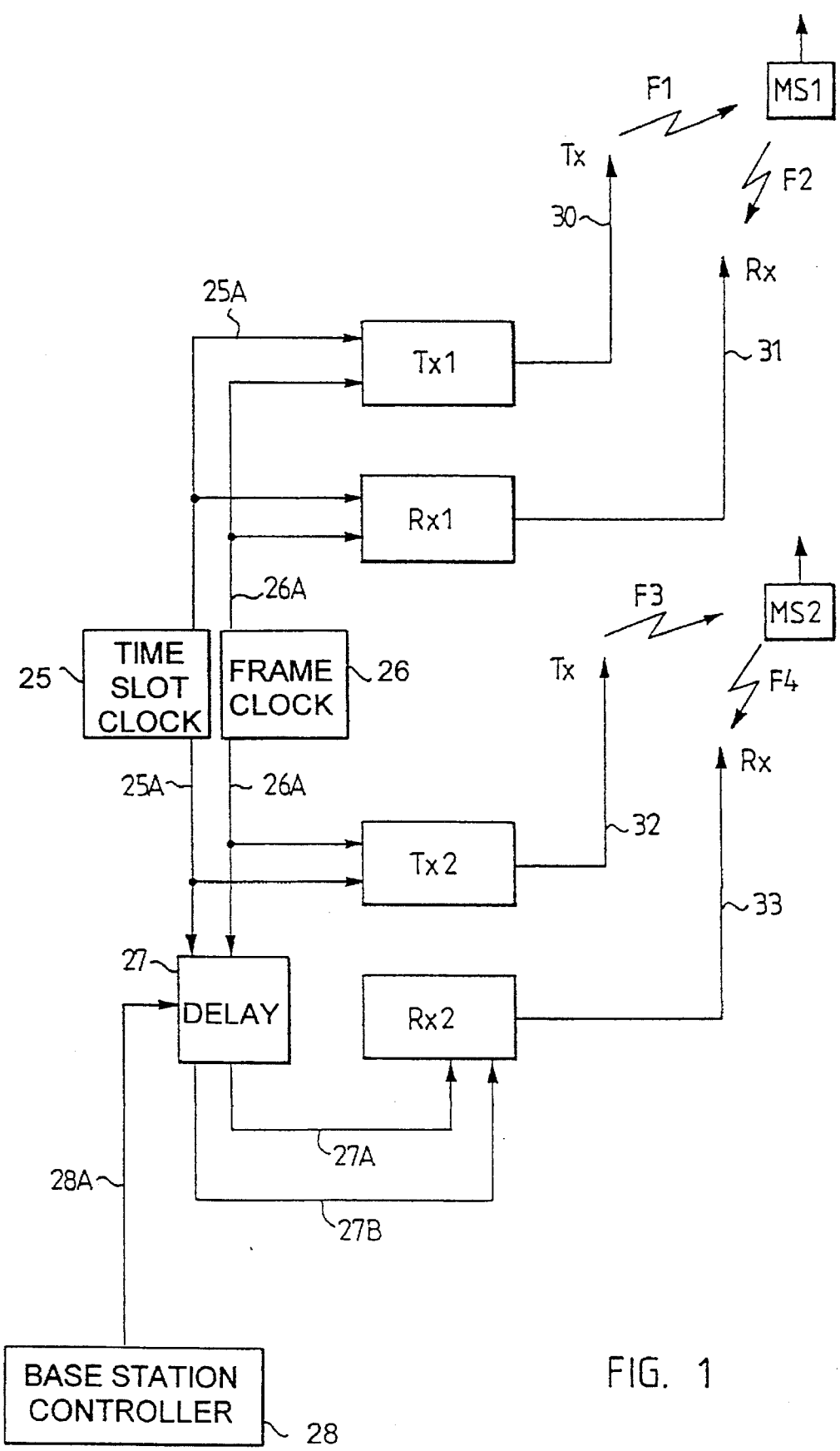

FIG. 1 shows a base station according to the invention. Referring to the base station, only parts and functions essential to the understanding of the invention will be described, i.e. mainly the timing of the transceivers of the base station. In addition, in the example, a TDMA system where communication takes place in frames of 8 time slots on a radio channel will be described.

Figure 2:
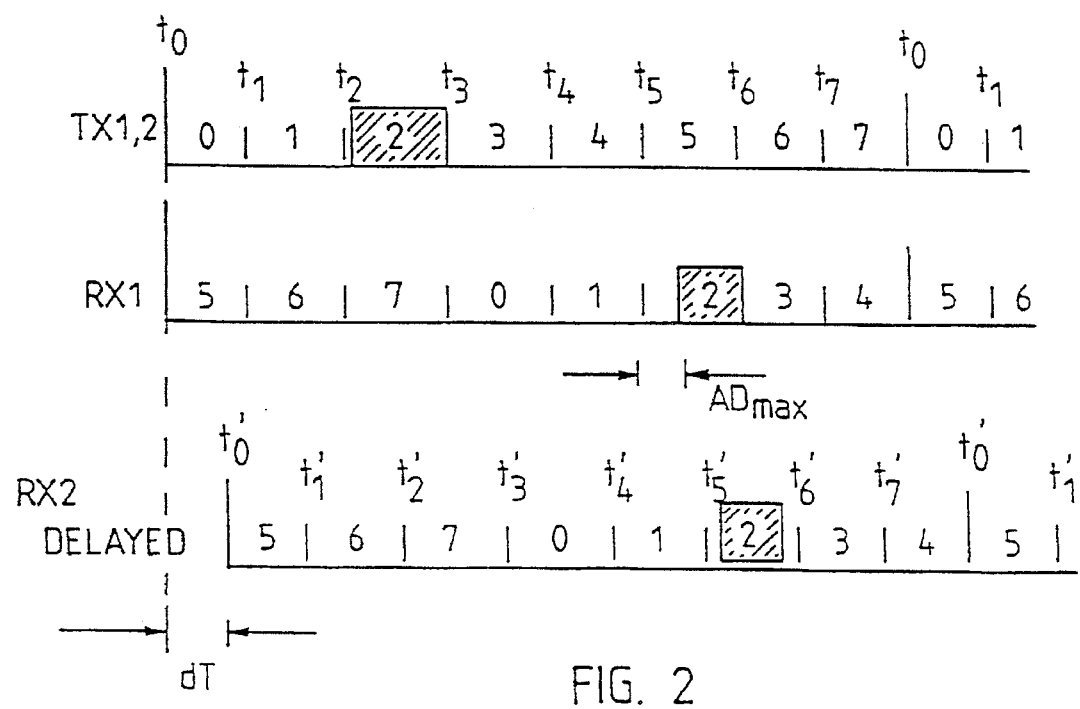

In FIG. 1, a radio transmitter Tx1 and a radio receiver form a transceiver fully similar to a conventional base station transceiver in structure and operation. At the base station a time slot clock generator 25 and a frame clock generator 26 generate a time slot clock 25A and a frame clock 26A, respectively, required for the transceiver. Referring to FIG. 2, the TDMA frame period of the transceiver Tx1/Rx1 starts at a time to defined by the frame clock pulse 26A, and the first time slot of the frame begins at the same time. The following time slots of the frame begin at times $t_1$-$t_7$ determined by the time slot clock pulses 25A, until a new frame begins at a time $t_0$ determined by a new frame clock pulse 26A. In this specific case, one frame thus contains 8 time slots, but the number of time slots may be smaller or greater, e.g. 4, depending on the system. In FIG. 2, the time slots are numbered from TS0 to TS7. In the transceiver Tx1/Rx1, operating in a normal way, the frame periods of both the receiver and the transmitter begin at the same time $t_0$. Correspondingly, the time slots begin at the same times $t_0$-$t_7$. Time slot numberings, however, differ in that each time slot number occurs on the reception side three time slots later than the respective time slot number on the transmission side.

The operation of the transceiver Tx1/Rx1 will be discussed with reference to FIGS. 1 and 2 while assuming that a mobile radio station MS1 and the transceiver Tx1/Rx1 communicate in the TDMA time slot 2. Under the control of the clock signals 25A and 26A, the transmitter Tx1 starts the transmission of a burst addressed to the mobile station MS1 after the time $t_2$. The assembled radio-frequency burst is transmitted via a transmitting antenna 30 to the mobile station MS1 on a carrier F1. The mobile station MS1 receives the burst, is synchronized with the base station on the basis of synchronizing information contained in the burst, and transmits the radio-frequency burst to the base station on a carrier F2 approximately 3 time slots later. The receiver Rx1 receives the burst via a receiving antenna 31 in the reception time slot 2 between $t_5$ and $t_6$. Successful reception requires that the burst received from the mobile station MS1 fall within the right time slot at the receiver Rx1. However, if the mobile station MS1 is remote from the base station, propagation delays caused by the distance may delay the burst to such an extent that bursts from mobile stations MS using adjacent time slots overlap. For this reason, the transceiver Tx1/Rx1 measures the time difference occurring between the transmissions of the transceiver and the mobile station due to the distance between the base station and the mobile station. On the basis of the measurement, the transceiver calculates a timing advance required for the mobile station for compensating for the propagation delay caused by the distance. The base station signals this timing advance information to the mobile station MS1, which advances its time of transmission from the time determined by the burst received from the base station by an amount corresponding to the timing advance. In this way, the burst transmitted by the mobile station will reach the base station receiver Rx1 at the right time. Various intra-system limitations, however, set a maximum value $AD_{MAX}$ for the timing advance, and this maximum value in turn determines the maximum distance at which the propagation delay can still be compensated for. Accordingly, the maximum of the timing advance has limited the cell size of conventional base stations.

For this purpose, the base station shown in FIG. 1 comprises another transceiver having a transmitter Tx2 and a receiver Rx2, whereby the timing of the receiver Rx2 is delayed with respect to the transmitter Tx2. This is accomplished by applying the time slot clock signal 25A and the frame clock signal 26A generated by the clock generators 25 and 26 directly to the transmitter Tx2 but through a delay means 27 to the receiver Rx2. The delay means 27 produces a delayed frame clock signal 27A and a delayed time slot clock signal 27B.

The operation of the transceiver according to the present invention will again be described with reference to FIGS. 1 and 2 while assuming that communication between the base station and the mobile station MS2 takes place in the time slot 2. The transceiver Tx2 transmits a burst to the mobile station MS2 under the guidance of the frame and time slot signals 25A and 26A in the time slot 2 between $t_2$ and $t_3$. The radio-frequency burst is transmitted via the transmitting antenna 32 on a radio channel F3 to the mobile station MS2. The mobile station MS2 receives the burst, is synchronized with the base station on the basis of the synchronizing information contained in the burst, and transmits the burst to the base station on a radio channel F4 about three time slots later, depending on the timing advance. So far, the operation is similar to that of the transceiver Tx1/Rx1.

Now, however, the distance of the mobile station MS2 from the base station is greater than the maximum distance determined by the maximum value $AD_{MAX}$ of the timing advance. The timing advance is therefore not able to compensate for the propagation delay caused by the distance, and a burst transmitted by the mobile station MS2 would arrive at a conventional receiver partly during the following time slot. According to the invention, the time of reception of the receiver Rx2 is delayed with respect to the timing of the transmitter Tx2 by a predetermined delay dT. Referring to FIG. 2, the frame clock pulse arrives at the transmitter Tx2 and starts a new frame at $t_0$. However, the corresponding frame clock pulse, delayed by the delay means 27, does not arrive at the receiver Rx2 until at the time $t'_0 = t_0 + dT$. Similarly, each time slot pulse arrives at the receiver Rx2 delayed by the delay dT relative to the transmitter Tx2. In this way, the burst from the mobile station MS2 will have a period corresponding to the delay dT more time to arrive at the base station and fall into the right time slot. This, in turn, means that the distance of the mobile station MS2 from the base station can be increased by an amount corresponding to the propagation delay dT, i.e. the cell size of the base station increases. On the other hand, the receiver Rx2 is not able to receive bursts from mobile stations the distance of which from the base station is shorter than the propagation delay dT, as bursts from these mobile stations arrive at the base station too early. In this way, the transceiver Tx2/Rx2 will have a ring-shaped service area, the inner radius $r_1$ of which is directly proportional to the delay dT and the outer radius $r_2$ of which is $r_1 + r_{max}$, where $r_{max}$ is a maximum distance corresponding to the maximum value $AD_{MAX}$ of the timing advance. The required reception delay dT can be calculated from the equation $$dT = r_1/C,$$

where C is the velocity of light. To obtain a cell size extension of 20 km, for instance, the delay value will be about 67 μs.

Figure 3:
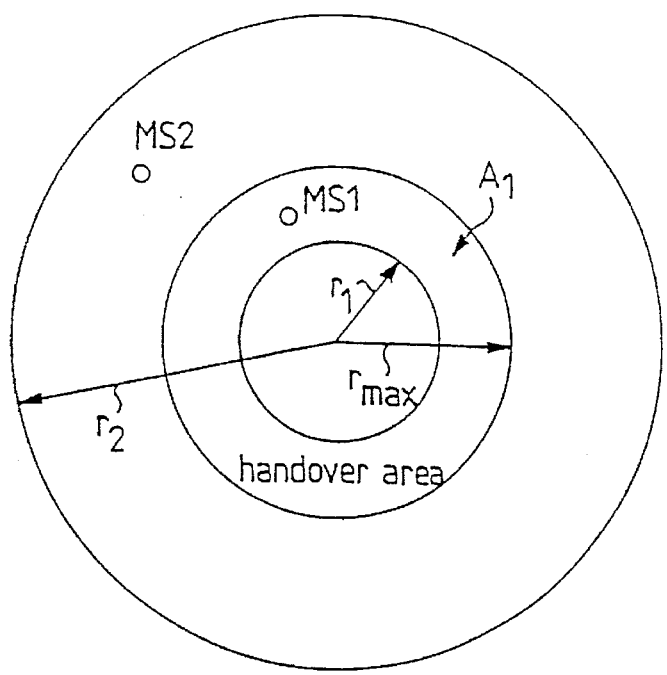

FIG. 3 shows the service area of a conventional transceiver Tx1/Rx1, the maximum radius $r_{MAX}$ of which is determined by the timing advance, and the service area of a transceiver RX2/TX2 according to the invention, the maximum radius of which is $r_2=r_1+r_{MAX}$. If both transceiver types are used at the same base station, the cell size of conventional base stations will be increased significantly.

In the cell shown in FIG. 3, the service areas of the conventional transceiver and the transceiver according to the invention preferably overlap to some extent, which allows interference-free handover within the base station from one transceiver to the other. Various criteria may be applied in handover, including the value of the timing advance assigned to the mobile station MS. For instance, when a mobile station located within the service area of the transceiver according to the invention moves in the direction indicated by the arrow A1 to the service area of the conventional transmitter, the base station performs a forced internal handover when the timing advance assigned to the mobile station falls below a predetermined value. Correspondingly, when a mobile station moves from the service area of the conventional transceiver to the service area of the transceiver according to the invention, the base station performs a forced internal handover when the timing advance assigned to the mobile station exceeds a predetermined value. The handover can be controlled from a base station controller 28. The base station controller 28 may also vary the delay dT set by the delay means 27 by a control signal 28A, e.g. within the range from 1 to 116 μs. The variable delay dT allows the location of the ring-shaped service area of the transceiver according to the invention to be altered in accordance with the requirements of the radio network, e.g. its load.

Figure 4:
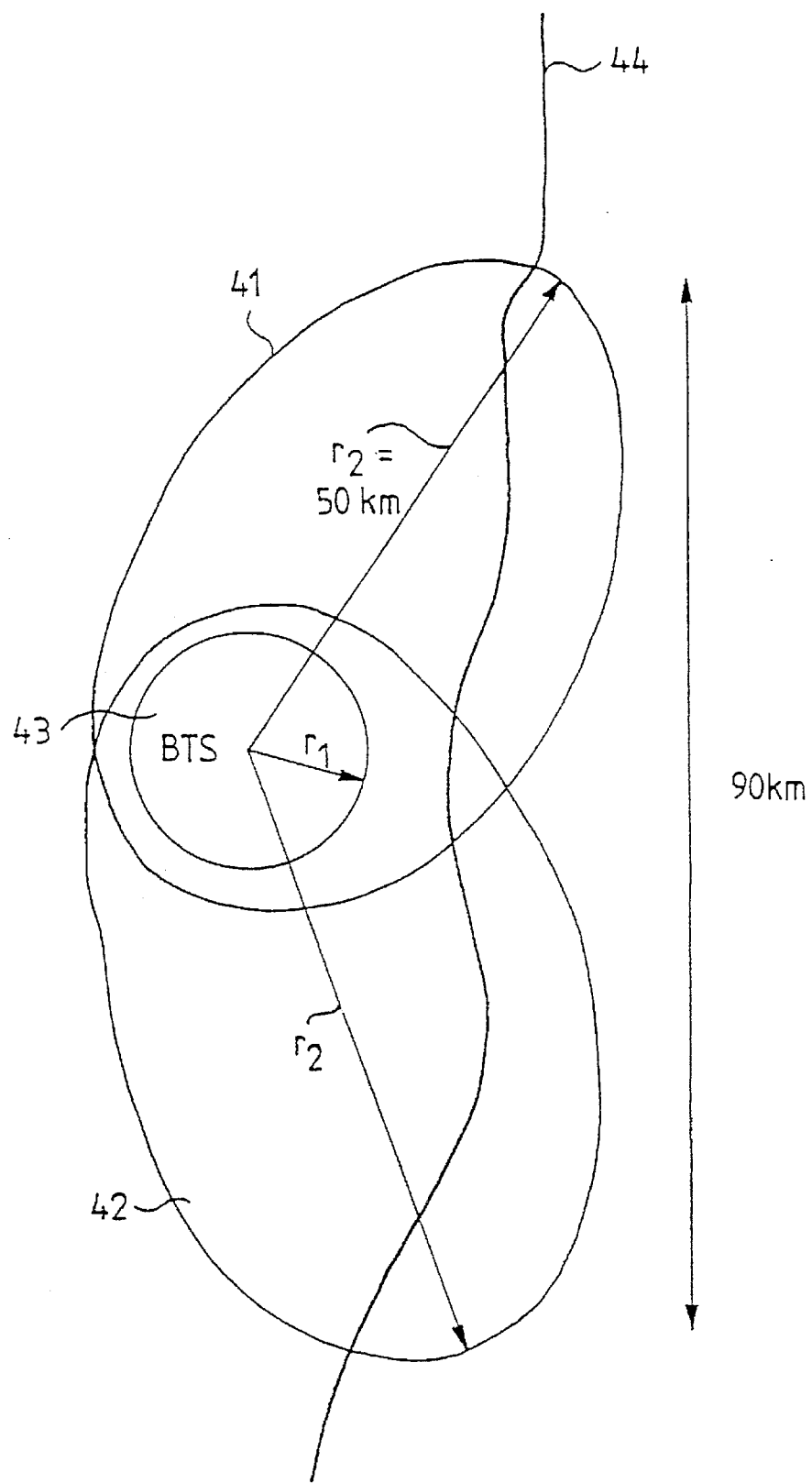

In certain special cases it may be possible to use a base station comprising merely transceivers according to the invention, which are provided with a delayed reception. The base station thereby has a ring-shaped cell where no services are provided for subscribers in the immediate vicinity of the base station. One such special case is shown in FIG. 4, where two transceivers according to the invention are connected to different directional antennas so that they will have separate elongated services areas 41 and 42 directed in different directions from the base station BTS. The base station BTS may be positioned at a high point in the terrain, in a mast, or in a building remote from a road 44 passing by so that there is no need for service provision in the immediate vicinity of the station, and a shadow area 43 will not be disadvantageous. However, the extended service areas 41, 42 of the base station cover a very long section of the road passing by, while several base stations have previously been needed for the road section. Intracell handover is here performed by a normal handover procedure.

The figures and the description related to them are only intended to illustrate the present invention. In its details, the base station according to the invention may vary within the scope of the attached claims.

I claim:

1. A base station for a digital time division multiple access (TDMA) radio network, the base station comprising:

a radio transceiver, means for measuring a time difference between the transmissions of the transceiver and a mobile radio station due to a distance between the base station and the mobile radio station, means for controlling the mobile radio station to adjust its transmission relative to the transmission of the transceiver by a predetermined timing advance compensating for said time difference, said timing advance having a maximum value determining a maximum radius $r_{MAX}$ for an effective service area of the base station transceiver, means for providing a timing offset between the reception and the transmission of the transceiver in a manner that the maximum radius of the service area of the transceiver is $r_1+r_{MAX}$, and the service area has a central area which has a radius $r_1$ and within which the transceiver is not capable of providing services to mobile radio stations, where $r_1$ is directly proportional to said timing offset, and a second radio transceiver where the timing between reception and transmission is normal and the outer radius of the service area of which is at a distance $r_{MAX}$ from the base station, said offset between transmission and reception being selected so that the service areas of the first-mentioned transceiver and the second transceiver overlap.

2. A base station according to claim 1, wherein:

said timing offset dT between the reception and transmission is calculated from the equation $$dT=r_1/C,$$

where C is the velocity of light.

3. The base station according to claim 1, wherein:

said timing offset between the reception and transmission is variable.

4. The base station according to claim 1, wherein the service area of the first-mentioned transceiver is ring-shaped.

5. The base station according to claim 1, wherein:

the first-mentioned transceiver has a directional antenna and an elongated service area in a certain direction from the base station.

6. The base station according to claim 5, wherein:

the base station comprises another transceiver where the timing of reception is delayed relative to transmission by a predetermined delay, and that said first-mentioned transceiver has a directional antenna and an elongated service area in a direction away from the base station, which direction is different from the direction of the service area of the first-mentioned transceiver.

7. The base station according to claim 6, wherein:

service areas of the transceivers cover a long road section.

8. The base station according to claim 1, including:

means for performing the internal handover of the base station, when a mobile radio station moves from one service area of the base station to the other service area.

9. The base station according to claim 8, wherein:

said handover means perform the handover on the basis of the timing advance of the mobile radio station.

10. The base station according to claim 9, wherein:

said handover means perform a handover when the timing advance of a mobile radio station located within the service area of the second transceiver exceeds a predetermined value.

11. The base station according to claim 8, wherein:

said handover means perform a handover when the timing advance of a mobile radio station located within the service area of the first-mentioned transceiver falls below a predetermined value.

* * * * *